Figure 1:
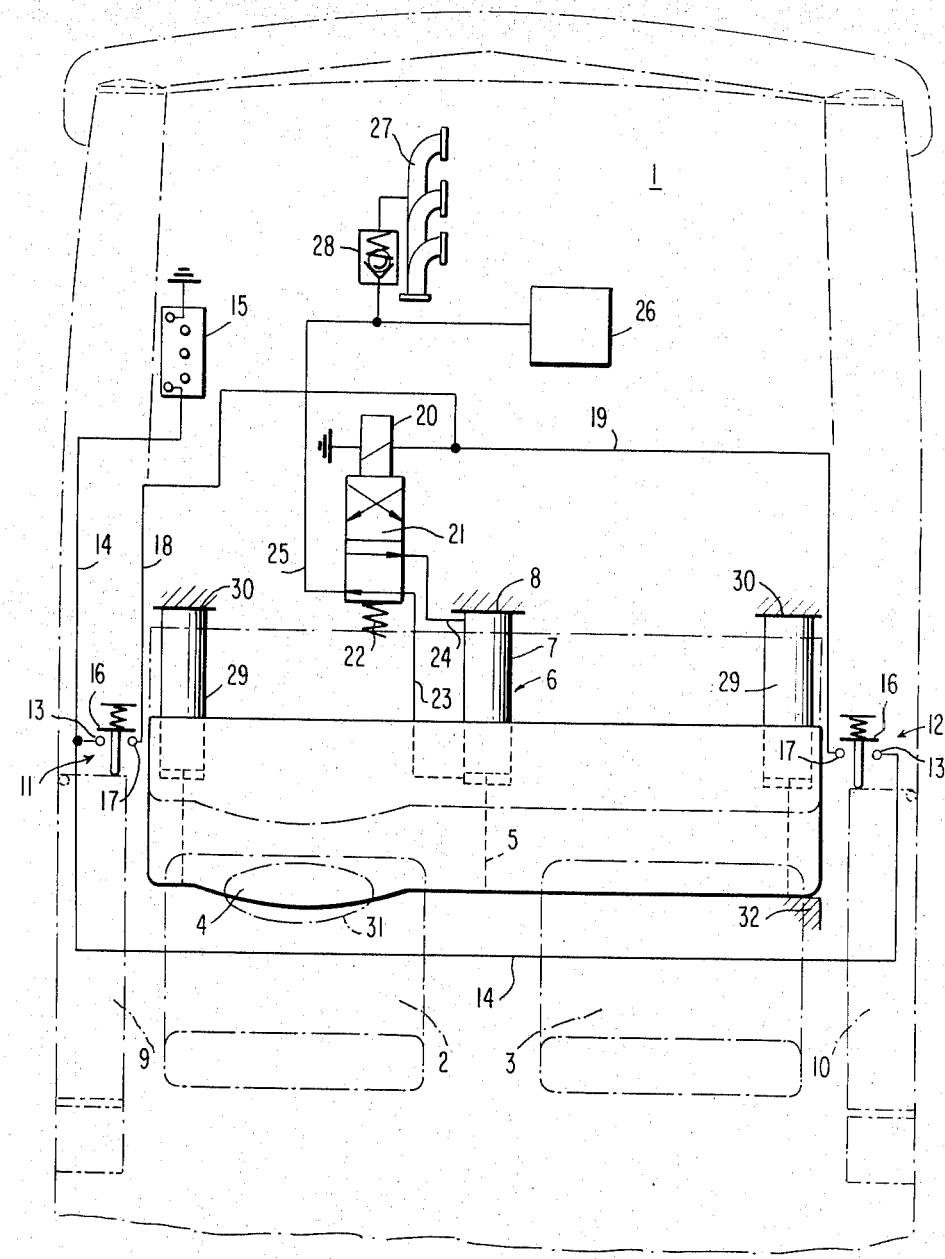

United States Patent [19]
Breitschwerdt

[11] 3,776,359
[45] Dec. 4, 1973

[54] INSTRUMENT PANEL FOR VEHICLES
[75] Inventor: Werner Breitschwerdt, Stuttgart, Germany
[73] Assignee: Daimler-Benz Aktiengesellschaft, Stuttgart, Germany
[22] Filed: Aug. 17, 1972
[21] Appl. No.: 281,279

[30] Foreign Application Priority Data
Aug. 17, 1971 Germany............... P 21 41 148.3

[52] U.S. Cl................ 180/90, 180/111, 280/150 B
[51] Int. Cl. ...................... B60k 37/00, B60r 21/02
[58] Field of Search................ 180/78 C, 82 R, 111, 180/112, 113, 90; 280/150 B; 296/65 R, 65 A, 70–74

[56] References Cited
UNITED STATES PATENTS
2,733,109  1/1956  Dooley et al............... 280/150 B X
2,902,292  9/1959  Land............................ 280/150 B
3,105,702  10/1963  Larson........................... 280/150 B
3,516,704  6/1970  Riester............................ 180/111 X Primary Examiner—Robert B. Reeves
Assistant Examiner—Frederick R. Handren
Attorney—Paul M. Craig, Jr. et al.

[57] ABSTRACT

An instrument panel for motor vehicles, especially with a negative profile formed approximately in accordance with the contours of a person seated facing the same, which is automatically displaceably arranged in the vehicle longitudinal direction in such a manner that with the opening of a front door, the instrument panel is displaced into a forward position remote from the driver and/or co-driver, and with the closing of the front doors is displaced into a rearward position close to the driver and co-driver; at least one damping member is provided which is supported, on the one hand, at the instrument panel and, on the other at a relatively fixed vehicle part and which is preferably constructed in the manner of a shock absorber.

34 Claims, 3 Drawing Figures

INSTRUMENT PANEL FOR VEHICLES

The present invention relates to an instrument panel for motor vehicles, especially with a negative profile formed approximately according to the contour lines of a seated person facing the same.

Tests of vehicle front-end collisions or impacts especially with persons having their seat belts not buckled, i.e., with persons whose seat belts are not fastened, have indicated that initially a forward sliding movement thereof occurs up to the impingement of the legs and knee portions thereof at the instrument panel. Only thereafter takes place a bending of the upper body for the most part up to an abutment at the instrument panel. As can be seen from the German Offenlegungsschrift 1,580,117, it has already been proposed to adapt the front side of an instrument panel to the contours of a person seated facing the same. By the use of such an arrangement, already after a short sliding distance, a uniform abutment of the leg portions is achieved in case of a front end collision or impact. The subsequently following impact of the upper body can then be absorbed, as intended, by correspondingly constructed areas of the instrument panel.

The aimed-at effect, however, is only achieved if a predetermined coordination is maintained between seat position and/or passenger in relation to the instrument panel which, for the most part, does not enable an easy ingress and egress of the vehicle. Owing to the possibility of a seat adjustment in the vehicle longitudinal direction which at present exists practically in all motor vehicles, a seat position is rapidly reached which in case of a front end collision or impact can lead to serious injuries of the passengers.

It is the aim of the present invention to provide an installation in which the aforementioned shortcomings are eliminated so that the advantages of a front end of an instrument panel formed according to the contours of a seated person and equipped with differing elastic areas can become fully effective.

This is achieved if, according to the present invention, the instrument panel is automatically displaceably arranged in the vehicle longitudinal direction in such a manner that with the opening of a front door the instrument panel is brought into a forward position remote from the driver and/or co-driver and with the closing of the front door is brought into a rearward position near the driver and/or co-driver, and if at least one damping member is provided which is supported, on the one hand, at the instrument panel and, on the other, at a relatively fixed vehicle part. The damping member then goes advantageously into action in case of an impact if the limit of the elastic deformability of the instrument panel is reached.

A reliable functioning of the installation is achieved if the automatic displacement of the instrument panel is initiated by a preferably compressible operating or working medium.

In a motor vehicle with an internal combustion engine, the vacuum prevailing in the suction pipe can be used as working medium.

In one advantageous embodiment of the present invention, the damping member is constructed in the manner of a shock absorber.

It is also possible to subdivide the instrument panel approximately in the direction of the center longitudinal axis of the vehicle whereby the longitudinal displacement of each part can take place in dependence of the opened or closed condition of the respectively adjacent front door.

It is of particular advantage if the adjusting movement of the instrument panel or of each section of the instrument panel is attained by at least one double-acting piston-cylinder unit supported, on the one hand, at the instrument panel and, on the other, at a fixed vehicle part, and if the distance of extension with a unitary instrument panel or with the section of a two-partite instrument panel near the driver is limited by at least one abutment fixed at the vehicle and coordinated to the position of the steering wheel and if the distance of extension of the section of a two-partite instrument panel facing the co-driver seat is limited by at least one abutment displaceable in the vehicle longitudinal direction in unison with the co-driver or passenger seat.

A very simple shifting is achieved if the piston-cylinder unit coordinated to a unitary instrument panel or the piston-cylinder units is or are acted upon with vacuum by way of a displacement valve which with closed front doors is retained in its normal position by the effect of a spring and which upon opening of a front door is displaced into its operating or working position by the effect of an electromagnet, preferably by way of the associate door contact switch.

An equally simple shifting construction is realized if with a two-partite instrument panel, the piston-cylinder unit or units coordinated to each part is or are acted upon by way of a spring-loaded displacement valve which always assumes a position caused in dependence on the condition of the respectively coordinated front door.

It may be of particular advantage if in a two-partite instrument panel in case of a longitudinal displacement of the co-driver or passenger seat, the part of the instrument panel facing the co-driver seat is automatically displaced in the direction of its position remote from the co-driver and which after termination of the displacement operation returns automatically into a position matched to the new position of the co-driver seat or of the passenger.

Appropriately one piston-cylinder unit and one damping member disposed preferably one above the other in an aperture or recess of the instrument panel engage approximately centrally at a unitary instrument panel or at each part of a two-partite instrument panel.

A good force introduction and transmission is achieved if a respectively centrally engaging piston-cylinder unit is surrounded on both sides by two damping members disposed in a horizontal plane.

Accordingly, it is an object of the present invention to provide an instrument panel for motor vehicles which avoids by simple means the aforementioned shortcomings and drawbacks encountered in the prior art.

Another object of the present invention resides in an instrument panel for motor vehicles which permits the realization of absorbing the impact of the upper body by the correspondingly constructed areas of the instrument panel yet facilitates the ingress and egress into and out of the vehicle.

A further object of the present invention resides in an instrument panel for motor vehicles which permits the maintenance of a predetermined coordination between seat position and/or passenger with respect to the instrument panel while at the same time facilitating boarding and leaving the vehicle.

A still further object of the present invention resides in an instrument panel for motor vehicles which minimizes injuries to the passengers in case of front end collisions or impacts notwithstanding the usual seat adjustment possibility of the individual front seats of the vehicle.

Still another object of the present invention resides in an adjustable instrument panel for motor vehicles adapted to be displaced in the longitudinal direction of the vehicle, which assures a safe and reliable functioning by simple means, utilizing readily available working media.

Another object of the present invention resides in an instrument panel displaceable in the vehicle longitudinal direction to adapt itself to the requirements of the existing conditions which utilizes relatively simple parts, assuring reliable operation.

Figure 2:
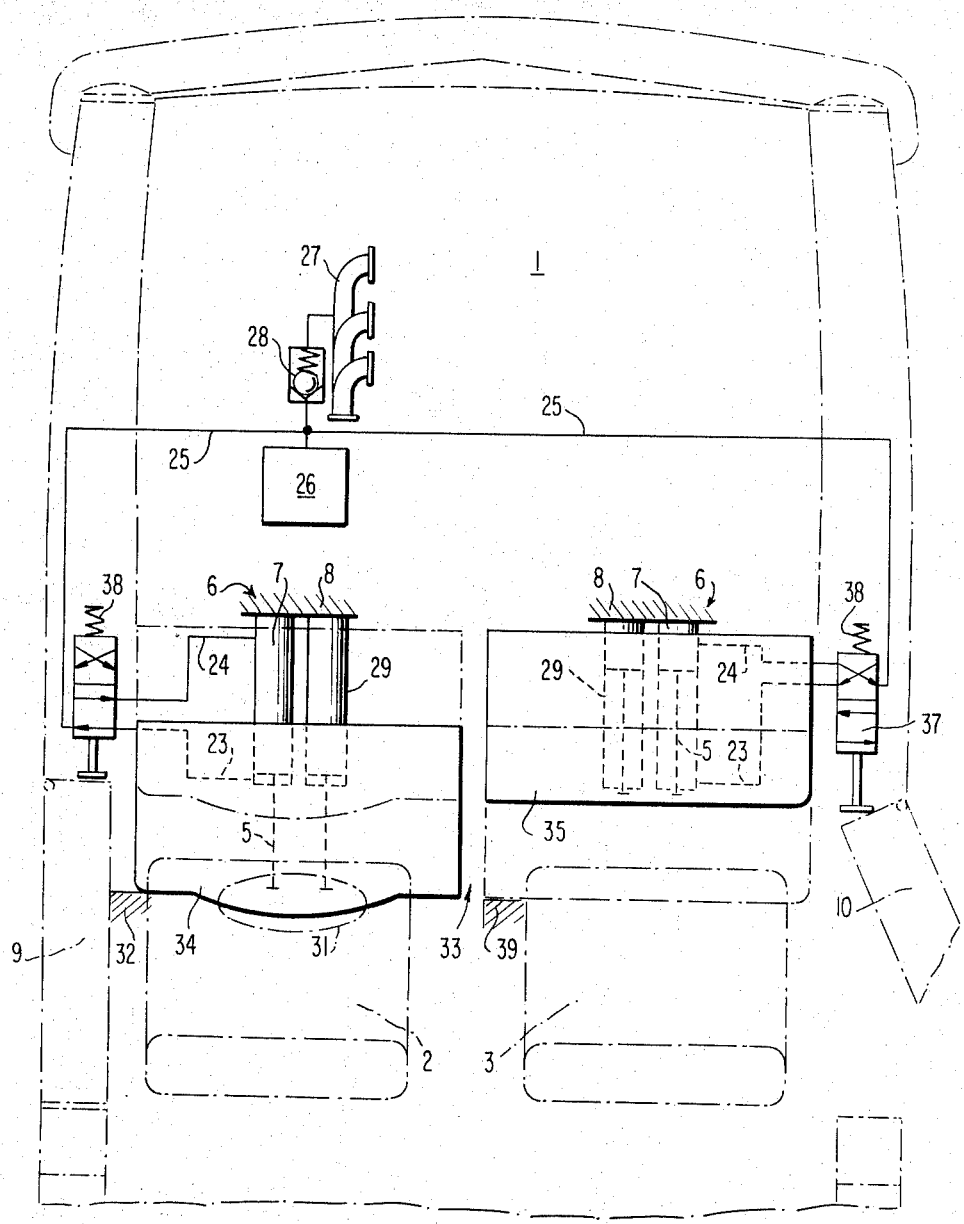
Figure 3:
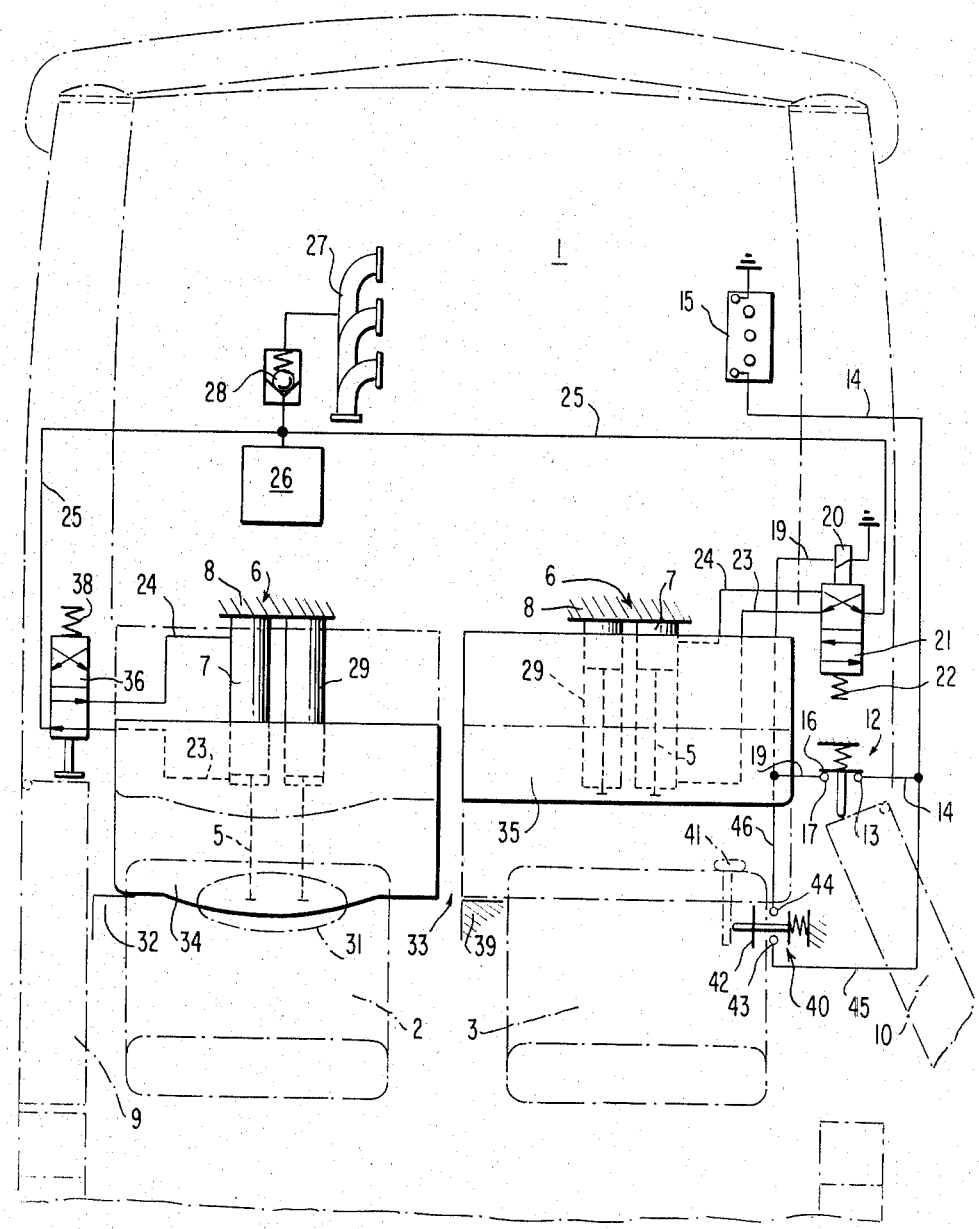

These and further objects, features, and advantages of the present invention will become more apparent from the following description when taken in connection with the accompanying drawing which shows, for purposes of illustration only, three embodiments in accordance with the present invention, and wherein:

FIG. 1 is a somewhat schematic plan view on a unitary instrument panel displaceable in the vehicle longitudinal direction in accordance with the present invention, illustrated in the extended condition;

FIG. 2 is a schematic plan view on a two-partite instrument panel displaceable in the vehicle longitudinal direction in accordance with the present invention with an opened co-driver or passenger front door; and FIG. 3 is a schematic plan view on a two-partite instrument panel displaceable in the vehicle longitudinal direction in accordance with the present invention with an additional disengaging device at the co-driver seat.

Referring now to the drawing wherein like reference numerals are used throughout the various views to designate like parts and more particularly to FIG. 1, a motor vehicle 1 indicated in its controus in dash and dot lines and having a driver seat and a co-driver or passenger seat 3 of conventional construction is equipped with an instrument panel 4. The piston rod 5 of a double-acting piston-cylinder unit generally designated by reference numeral 6 and approximately centrally arranged, which points in the vehicle longitudinal direction, is secured at the instrument panel 4 in a suitable known manner. The housing 7 of the piston-cylinder unit 6 is connected with a part 8 fixed with the vehicle and indicated only schematically. A door contact switch generally designated by reference numerals 11 and 12 is coordinated to a respective front door 9 and 10; a contact 13 of the door contact switches 11 and 12 is connected by way of a line 14 with a terminal of the vehicle battery 15 whose other terminal is connected to ground. Lines 18 and 19 lead from the contacts 17 which are electrically connected in case of actuation with the contacts 13 by way of contact bridges 16, to one terminal connection of an electromagnet 20 whose other terminal connection is connected to ground. The electromagnet 20 acts in the energized condition on a displacement valve 21 of conventional construction which is normally displaced into its normal rest position by the force of a spring 22. Lines 23 and 24 starting from the by-pass valve 21 lead to the piston-cylinder unit 6. On the atmosphere side, the by-pass valve 21 is connected by way of a line 25 with a supply or storage tank 26 that is fed with vacuum from the suction pipe 27 of an internal combustion engine (not shown) under interposition of a check valve 28. Two damping members 29 which are constructed in the manner of a shock-absorber are supported, on the one hand, at the instrument panel 4 and, on the other, at a relatively fixed vehicle part 30.

Due to the closed position of the doors 9 and 10 illustrated in FIG. 1, both contact bridges 16 of the door contact switches 11 and 12 are lifted off from the contacts 13 and 17. The displacement valve 21 is in its normal rest position as a result of the force of the spring 22 whereby vacuum reaches one side of the piston cylinder unit 6 by way of the lines 23 and 25. The other side of the piston cylinder unit 6 is vented by way of the line 24 so that the piston rod 5 together with the instrument panel 4 is extended in the direction of the steering wheel 31 whereby simultaneously, the damping members 29 are extended in unison therewith. An abutment 32 limits the travel or stroke of the piston-cylinder unit 6. Appropriately, the instrument panel 4 forms in the extended condition a surface together with the steering wheel 31 so that also for the driver as flush an area as possible is available in case of impact.

If, for example, the front door 9 is opened, then the contact bridge 16 of the door contact switch 11 connect the contacts 13 and 17 so that current can flow from the battery 15 by way of the lines 14 and 18 to the electromagnet 20. The latter attracts and displaces the displacement valve 21 into its operating or working position whereby vacuum reaches the piston cylinder unit 6 by way of the lines 24 and 25 and atmospheric air reaches the piston cylinder unit 6 by way of the line 23. Consequently, a retraction of the damping members 29 and of the instrument panel 4 takes place into a position indicated in dash line which is convenient for the egress. After the closing of the door 9, the instrument panel 4 returns automatically into the position illustrated in full lines.

The embodiment illustrated in FIG. 2 is far-reachingly similar to the embodiment of FIG. 1. For purposes of simplification similar parts are designated in these two figures by similar reference numerals. A two-partite instrument panel generally designated by reference numeral 33 is used in this embodiment which is formed of the parts or sections 34 and 35 displaceable independently of one another in the vehicle longitudinal direction by a respective piston cylinder unit 6 with feedback on a respective damping member 29. For purposes of simplifying the illustration of the relationships, the coordinated piston cylinder unit 6 and the damping member 29 are indicated arranged adjacent one another though it is understood that they can be arranged one above the other or that two or more damping members can be arranged above and below or adjacent the piston cylinder unit. The front doors 9 and 10 act on similar displacement valves 36 and 37 again of conventional construction. By the closed door 9 the displacement valve 36 is displaced into the rest position against the force of a spring 38 so that owing to the vacuum effect the piston rod 5 connected with the part 34 is extended and simultaneously brings the damping member 29 into a position ready for shock absorption. As in FIG. 1, an abutment 32 fixed at the vehicle assures for an advantageous position of the part 34 of the instrument panel 33 with respect to the steering wheel 31.

The door 10 on the co-driver or passenger side is opened and the coordinated displacement valve 37 is displaced into its working position by the force of the spring 38. A retraction of the part 35 of the instrument panel 33 up to a position facilitating boarding and leaving is achieved by means of the piston cylinder unit 6 by the vacuum effect by way of the lines 24 and 25. An abutment 39 connected with the co-driver seat 3 limits the forward or extension movement of the part 35 after the closing of the door 10. The abutment 39 can be displaced relative to the co-driver seat 3 in any conventional manner (not shown) so that in addition to the coordination between the position of seat and instrument panel also the size or body stature of the co-driver can be taken into consideration.

An embodiment is illustrated in FIG. 3 which is constituted essentially of elements of the embodiments of FIGS. 1 and 2 whereby again similar parts taken from both of these embodiments are designated by similar reference numerals.

The construction and operation of the adjusting mechanism for the part 34 of the instrument panel 33 facing the driver seat 2 is identical with the installation described in connection with FIG. 2.

For the initiation of an adjusting movement of the part 35 of the instrument panel 33, a displacement valve 21 is provided as in FIG. 1, which with a closed door 10 is displaced into its normal rest position by the force of a spring 22 whereas with an open door 10 it is displaced into its working or operating position by the effect of an electromagnet 20. In addition to the engaging or energizing possibility of the electromagnet 20 by a door contact switch 12 at the door 10, a further switch generally designated by reference numeral 40 is present in proximity to the co-driver seat 3 which is connected with the disengaging lever 41 for the longitudinal displacement of the co-driver seat 3 in such a manner that upon actuation of the disengaging or release lever 41, a contact bridge 42 connects with each other two contacts 43 and 44. In case of actuation, current flows from the vehicle battery 15 by way of the line 14 and by way of a line 45 branching off from the line 14 to a line 46 leading to the line 19 by way of the switch 40. The same effect is achieved also by the opening of the door 10—as illustrated in FIG. 3.

By the arrangement of switch 40, a position of the part 35 of the instrument panel 33 matched to another seat position can thus be attained during the drive.

While I have shown and described three embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An instrument panel arrangement for motor vehicles characterized by instrument panel means displaceable in the vehicle longitudinal direction, means for automatically displacing the instrument panel means in the vehicle longitudinal direction in such a manner that with the opening of a front door, the instrument panel means is displaced into a forward position remote from the driver or co-driver and with the closing of the respective front door, the instrument panel means is brought into a rearward position near the driver or co-driver, and damping means supported, on the one hand, at the instrument panel means and, on the other, at a relatively fixed vehicle part.

2. An instrument panel arrangement according to claim 1, characterized in that the instrument panel means has a negative profile matched approximately to the contours of a person seated facing the same.

3. An instrument panel arrangement according to claim 1, characterized in that the automatic displacement of the instrument panel means in the vehicle longitudinal direction is initiated by a working medium.

4. An instrument panel arrangement according to claim 3, characterized in that the working medium is a compressible working medium.

5. An instrument panel arrangement according to claim 3, in a motor vehicle with an internal combustion engine, characterized in that the vacuum prevailing in the suction pipe of the engine is used as working medium.

6. An instrument panel arrangement according to claim 5, characterized in that the damping means is constructed in the manner of a shock absorber.

7. An instrument panel arrangement according to claim 6, characterized in that the instrument panel means is divided approximately in the direction of the center longitudinal axis of the vehicle, and in that the longitudinal displacement of each part of the subdivided instrument panel means takes place in dependence on the opened and closed condition of the respectively adjacent front door.

8. An instrument panel arrangement according to claim 6, characterized in that the adjusting movement of the instrument panel means is achieved by at least one double-acting piston-cylinder unit supported, on the one hand, at the instrument panel means and, on the other, at a relatively fixed vehicle part.

9. An instrument panel arrangement according to claim 7, characterized in that the adjusting movement of each part of a two-partite instrument panel means is achieved by at least one double-acting piston-cylinder unit supported, on the one hand, at the respective part of the instrument panel means and, on the other, at a relatively fixed vehicle part.

10. An instrument panel arrangement according to claim 8, characterized in that the distance of extension in case of a unitary instrument panel means is limited by at least one abutment means fixed at the vehicle and coordinated to the position of a steering wheel.

11. An instrument panel arrangement according to claim 9, characterized in that in case of a two-partite instrument panel means the distance of extension of the part of the instrument panel means coordinated to the co-driver seat is limited by at least one abutment means displaceable in the vehicle longitudinal direction together with the co-driver seat.

12. An instrument panel arrangement according to claim 9, characterized in that in case of a two-partite instrument panel means the distance of extension of the part of the instrument panel means coordinated to the driver seat is limited by at least one abutment means fixed at the vehicle and coordinated to the position of the steering wheel and the distance of extension of the part of the instrument panel means coordinated to the co-driver seat is limited by at least one abutment means displaceable in the vehicle longitudinal direction together with the co-driver seat.

13. An instrument panel arrangement according to claim 8, characterized in that the piston-cylinder unit coordinated to a unitary instrument panel means is acted upon with vacuum by way of a displacement valve means which with closed front doors is held in its normal rest position by the effect of a spring and which upon opening of a front door is displaced into its working position.

14. An instrument panel arrangement according to claim 13, characterized in that upon opening of a front door the displacement valve means is transferred into its working position by way of door contact switch means and by the effect of an electromagnet operatively connected with the door contact switch means.

15. An instrument panel arrangement according to claim 12, characterized in that in case of a two-partite instrument panel means, the piston-cylinder unit coordinated to a respective part of the instrument panel means is acted upon by a spring-loaded displacement valve means which assumes always a position caused in dependence on the condition of the respectively coordinated front door.

16. An instrument panel arrangement according to claim 12, characterized in that in case of a two-partite instrument panel means, upon longitudinal displacement of the co-driver seat, the part of the instrument panel means facing the same is displaced automatically in the direction of its position remote from the co-driver and after termination of the displacement operation returns into a position matched to the new position of the co-driver seat.

17. An instrument panel arrangement according to claim 16, characterized in that one piston-cylinder unit and one damping means each engage approximately centrally at each part of a two-partite instrument panel means.

18. An instrument panel arrangement according to claim 17, characterized in that the approximately centrally engaging piston-cylinder unit and damping means of a respective part of an instrument panel are disposed one above the other in an aperture of the instrument panel means.

19. An instrument panel arrangement according to claim 16, characterized in that a respective centrally engaging piston-cylinder unit is surrounded on both sides by two approximately horizontally disposed damping means.

20. An instrument panel arrangement according to claim 19, characterized in that the instrument panel means has a negative profile matched approximately to the contours of a person seated facing the same.

21. An instrument panel arrangement according to claim 1, characterized in that the damping means is constructed in the manner of a shock absorber.

22. An instrument panel arrangement according to claim 1, characterized in that the instrument panel means is divided approximately in the direction of the center longitudinal axis of the vehicle, and in that the longitudinal displacement of each part of the subdivided instrument panel means takes place in dependence on the opened and closed condition of the respectively adjacent front door.

23. An instrument panel arrangement according to claim 1, characterized in that the adjusting movement of the instrument panel means is achieved by at least one double-acting piston-cylinder unit supported, on the one hand, at the instrument panel means and, on the other, at a relatively fixed vehicle part.

24. An instrument panel arrangement according to claim 1, characterized in that the adjusting movement of each part of a two-partite instrument panel means is achieved by at least one double-acting piston-cylinder unit supported, on the one hand, at the respective part of the instrument panel means and, on the other, at a relatively fixed vehicle part.

25. An instrument panel arrangement according to claim 1, characterized in that the distance of extension in case of a unitary instrument panel means is limited by at least one abutment means fixed at the vehicle and coordinated to the position of a steering wheel.

26. An instrument panel arrangement according to claim 1, characterized in that in case of a two-partite instrument panel means the distance of extension of the part of the instrument panel means coordinated to the co-driver seat is limited by at least one abutment means displaceable in the vehicle longitudinal direction together with the co-driver seat.

27. An instrument panel arrangement according to claim 1, characterized in that in case of a two-partite instrument panel means the distance of extension of the part of the instrument panel means coordinated to the driver seat is limited by at least one abutment means fixed at the vehicle and coordinated to the position of the steering wheel and the distance of extension of the part of the instrument panel means coordinated to the co-driver seat is limited by at least one abutment means displaceable in the vehicle longitudinal direction together with the co-driver seat.

28. An instrument panel arrangement according to claim 23, characterized in that the piston-cylinder unit coordinated to a unitary instrument panel means is acted upon with vacuum by way of a displacement valve means which with closed fornt doors is held in its normal rest position by the effect of a spring and which upon opening of a front door is displaced into its working position.

29. An instrument panel arrangement according to claim 28, characterized in that upon opening of a front door the displacement valve means is transferred into its working position by way of door contact switch means and by the effect of an electromagnet operatively connected with the door contact switch means.

30. An instrument panel arrangement according to claim 24, characterized in that in case of a two-partite instrument panel means, the piston-cylinder unit coordinated to a respective part of the instrument panel means is acted upon by a spring-loaded displacement valve means which assumes always a position caused in dependence on the condition of the respectively coordinated front door.

31. An instrument panel arrangement according to claim 1, characterized in that in case of a two-partite instrument panel means, upon longitudinal displacement of the co-driver seat, the part of the instrument panel means facing the same is displaced automatically in the direction of its position remote from the co-driver and after termination of the displacement operation returns into a position matched to the new position of the co-driver seat.

32. An instrument panel arrangement according to claim 1, characterized in that one piston-cylinder unit and one damping means each engage approximately centrally at each part of a two-partite instrument panel means.

33. An instrument panel arrangement according to claim 32, characterized in that the approximately centrally engaging piston-cylinder unit and damping means of a respective part of an instrument panel are disposed one above the other in an aperture of the instrument panel means.

34. An instrument panel arrangement according to claim 1, characterized in that a respective centrally engaging piston-cylinder unit is surrounded on both sides by two approximately horizontally disposed damping means.

* * * * *